United States Patent [19]

Van de Walle et al.

[11] Patent Number: 5,211,852
[45] Date of Patent: May 18, 1993

[54] PROCESS FOR REMOVAL OF METAL IONS FROM WATER

[75] Inventors: Richard H. Van de Walle, Columbia; Mark T. Wajer, Baltimore, both of Md.; David M. Smith, Kearneysville, W. Va.

[73] Assignee: Martin Marietta Magnesia Specialties Inc., Hunt Valley, Md.

[21] Appl. No.: 812,801

[22] Filed: Dec. 23, 1991

Related U.S. Application Data

[63] Continuation-in-part of Ser. No. 635,676, Dec. 28, 1990, abandoned.

[51] Int. Cl.$^5$ .............................................. C02F 1/28
[52] U.S. Cl. .................................. 210/678; 210/681; 210/688; 210/912; 210/913
[58] Field of Search ............... 210/678, 681, 688, 912, 210/913

[56] References Cited

U.S. PATENT DOCUMENTS

| | | | |
|---|---|---|---|
| 4,181,607 | 1/1980 | Schiller et al. | 210/36 |
| 4,752,397 | 6/1988 | Sood | 210/662 |
| 4,834,957 | 5/1989 | Van de Walle | 423/268 |

OTHER PUBLICATIONS

Schiller et al., "Removal of Heavy Metals from Water", Published U.S. patent application Ser. No. 06/318,710, Department of the Interior, PB83-140913.
Schiller et al., "Removal of Heavy Metals from Water", Published U.S. patent application Ser. No. 06/325,269, Department of the Interior, PB83-140905.
J. E. Schiller, D. N. tallman & S. E. Khalafalla, "Mineral Processing Water Treatment Using Magnesium Oxide", Environmental Progress, May 1984, pp. 136-141.

*Primary Examiner*—Ivars Cintins
*Attorney, Agent, or Firm*—Gay Chin; Bruce M. Winchell

[57] ABSTRACT

Provided is a process for the removal of metal ions from water which comprises filtering the water through a bed or layer of granular lightburned or hardburned magnesium oxide. The use of granular hardburned or granular lightburned grades of the magnesium oxide provides one with a most effective process for the removal of metal ions, as well as a process which permits a greater throughput of water before the effectiveness of the magnesium oxide decreases substantially.

The process of the present invention also involves an acidic backwash to regenerate the granular magnesium oxide. The acidic backwash is used to strip the captured metal ions from the surface of the granules, and has been found to be quite effective. The acid is generally a dilute acid, e.g., about 1 to 10 percent by weight acid concentration.

32 Claims, No Drawings

PROCESS FOR REMOVAL OF METAL IONS FROM WATER

RELATED APPLICATION

This is a continuation-in-part of copending U.S. Pat. application Ser. No. 07/635,676, filed Dec. 28, 1990, now abandoned.

BACKGROUND OF THE INVENTION

The present invention relates to a process for the removal of dissolved metals from water. More particularly, the present invention relates to a novel process for efficiently removing metal ions, e.g., copper, zinc, cadmium, lead, chromium and nickel, from water, which process also includes effective regeneration of the filtration media.

Under environmental regulations, limits are placed on the types and amounts of pollutants that can be released into the environment. To limit the pollution of our waterways, various treatment systems are employed by industry to remove toxic metal ions from process waters prior to their discharge into natural waterways, municipal sewer systems, deep well injection, etc. Such water containing toxic metal ions is generally created by metallurgical processes, mine drainage and metal finishing processes. Many different treatments have been utilized in an attempt to remove the metal ions in order to meet the environmental regulations in a most cost effective and efficient manner.

Chemical precipitation of metal hydroxides is the most common way to remove such dissolved metals from water. In general practice, sufficient lime or caustic soda is added to raise the pH above 8 or 9, forming a fluffy, suspended hydroxide precipitate. After adequate settling, the metal sludge is disposed of or reclaimed. Lime is almost always used because of its low cost, and coagulants are generally added to improve the settling process. The most common coagulants for hydroxide precipitates are water-soluble organic polymers. These polymers attach to particles and cause small ones to collect together to make larger aggregates that settle more rapidly.

Chemical precipitation of metals using soda ash (sodium carbonate) is common, or sodium sulfide is also used where insoluble compounds result. More specific chemicals are sometimes employed for particular metals. Starch xanthate is a precipitant with functional groups that form several insoluble metal salts.

There are many disadvantages, however, to such a treatment utilizing chemical precipitation, such as: (1) the precipitate can settle slowly and incompletely, particularly if the metal ions are dilute, (2) the sludge is voluminous and contains a low percentage of solids even after long settling times, (3) the precipitate is easily redispersed by thermal agitation, such as that occurring during seasonal temperature changes in settling ponds, and (4) the metals are readily redissolved if the precipitate is contacted with slightly acidic water. Accordingly, other processes have been applied for metals removal, including reverse osmosis, ion exchange, activated-carbon adsorption, cementation, and extraction.

The use of MgO for metal ion removal from water has been suggested. For example, in the article "Mineral Processing Water Treatment Using Magnesium Oxide" by Joseph E. Schiller, Daniel N. Tallman and Sanaa E. Khalafalla, *Environmental Progress*, May, 1984, granular deadburned periclase MgO and powdered MgO are disclosed as being appropriate in the removal of suspended solids and dissolved heavy metals. Furthermore, published patent application 6-318-710 of the Department of Interior discloses the use of granular MgO, and deadburned MgO (periclase) specifically for metal ion removal from water. Specific metal ions listed in the publication as being suitably removable include zinc, cadmium, iron, copper, lead, chromium and nickel. Published patent application 6-325-269 of the Department of the Interior discloses the use of reactive MgO powder to precipitate such metal ions from water.

While the use of granular deadburned (periclase) MgO or powdered reactive MgO has been found to be somewhat effective in the removal of metal ions, more efficient and effective treatments would greatly enhance the opportunities for meeting and exceeding environmental regulations in a cost effective manner. A process which included a truly effective method of regenerating the filtration media, to thereby prolong the useful life of the MgO used, would also be of great benefit.

Accordingly, it is an object of the present invention to provide a novel, and improved method of treating water containing metal ions.

It is another object of the present invention to provide such a method which employs granular lightburned and hardburned MgO.

Yet another object of the present invention is to provide a method for the removal of metal ions which permits greater throughput of water before the efficiency of the MgO is greatly decreased.

Still another object of the present invention is to provide a novel method of removing metal ions from water using granular lightburned and hardburned MgO which is more effective in the amount of metal ions removed.

Another object of the present invention is to provide such a method for removing metal ions from water while permitting effective, periodic regeneration of the granular lightburned and hardburned MgO.

These and other objects of the present invention will become apparent upon a review of the following specification and the claims appended thereto.

SUMMARY OF THE INVENTION

In accordance with the foregoing objectives, there is provided a process for the removal of metal ions from water which comprises filtering the water through a bed or layer of granular lightburned or hardburned magnesium oxide. The use of granular hardburned or granular lightburned grades of the magnesium oxide results in a most effective process for the removal of metal ions, as well as a process which permits a greater throughput of water before the effectiveness of the magnesium oxide decreases substantially.

In another embodiment of the present invention, an acidic backwash is employed to regenerate the granular magnesium oxide. The backwash with the acid is used to strip the absorbed metal ions from the surface of the granules. The acid solution used is generally that of a dilute acid, e.g., about 1 to 10 percent by weight.

DETAILED DESCRIPTION OF THE PREFERRED EMBODIMENTS OF THE INVENTION

The present invention relates to a process for the removal of metal ions, e.g., copper, zinc, cadmium, iron, lead, chromium, cobalt, nickel, aluminum, manganese, antimony, mercury, tin, beryllium, selenium, silver, thallium, and the like, from water. The process comprises filtering the water through a bed or layer of granular lightburned or hardburned magnesium oxide. Any conventional process providing liquid contact between the aqueous feed and the magnesium oxide can be used in the process of the present invention. Generally, the magnesium oxide is in a bed through which the aqueous feed or water is filtered, trickled or percolated. While gravity flow systems, e.g., trickling filters, can be incorporated for use in the process of the present invention, it is most preferred that a pressurized filtration unit be employed. This filtration unit may be constructed from any type of pressurized filtration chamber/container system currently available to the industry. The filtration unit is simply filled with the magnesia filtration medium. The exact style and dimensions of the filter chamber and the mesh sizing and bed depth of the granular magnesia employed can vary depending upon the process requirements, e.g., gallons per hour of water needing treatment, variation in metal ion concentration in the water needing treatment, the desired degree of metal ion removal to meet discharge limits, water-magnesia interface time, etc.

It is important for the efficiency and purposes of the process of the present invention to employ granular magnesia. The percent magnesia (on an as is basis) of the filter medium is generally in the range of from about 80 to 99.5 weight percent, with the remainder being oxides of calcium, silicon, aluminum and iron, among others. The magnesia most preferably ranges from about 95 to 99 weight percent. Calcium oxide (CaO) is typically present in the filter medium in a range of from about 0.5 to about 5 weight percent. The surface area of the granular magnesia filter media, in $m^2/g$, is generally in the range of from about 0.05 to about 200, more preferably in the range of from about 0.1 to about 60, and most preferably in the range of from about 0.1 to about 10.

The mesh size of the granular magnesia is also important, and it is generally in the range of from about ⅜ inch to about 325 mesh, U.S. Standard screen, and is most preferably in the range of from about 6 to 100 mesh.

It is most important for the purposes of the present invention that the magnesia be of the reactive lightburned grade or hardburned grade. There are generally three types of magnesia that are well established and recognized, namely, Lightburned (caustic) MgO—Magnesium oxide which has been produced within a temperature range of between 350° C. to about 1200° C. and with a BET surface area of greater than about one $m^2/g$ and with a porosity determination of greater than about 50% and possessing a loose bulk density (LBD) of less than about 45 lbs. per cubic ft. (0.72 g/cc) and a measured chemical magnesia activity (CMA), of less than about 100 sec. and with a crystal size of less than about 1000 angstroms (0.1 microns).

Hardburned MgO—Magnesium oxide which has been produced within a temperature of between about 1200° C. and about 1800° C. and with a BET surface area less than one $m^2/g$ and with a porosity of from about 3% to about 50% and possessing a bulk specific gravity (B.S.G.) of from about 1.8 to about 2.4 g/cc and a chemical magnesia activity (CMA) of from about 600 sec. to about 900 sec. and with a crystal size of from about one to about 5 microns.

Deadburned MgO (Periclase)—Magnesium oxide which has been produced from a temperature greater than about 1800° C. with a BET surface area of less than one $m^2/g$ and with a porosity of less than 20% and possessing a B.S.G. greater than about 2.9 g/cc and crystal size of more than about 25 microns.

The use of granular hardburned and granular lightburned reactive grades of magnesia have been found to be surprisingly effective at metal ion capture as compared to the use of deadburned magnesia (periclase). Not only is the use of the granular lightburned and hardburned magnesia found to be more effective with regard to the amount of metal ions that can be removed from an aqueous feed, more water throughput is observed before the effectiveness of the magnesia decreases substantially. This results in a much longer useful life of the filter media, and a more efficient and effective process overall.

In order to obtain the hardburned magnesia and particularly the lightburned magnesia in granular form, a densification and compaction process is employed to form the granules of appropriate size. The lightburned magnesia in particular is powdery in its natural produced state, and therefore must be formulated into granules by special techniques such as densification by briquetting.

In a preferred embodiment of the present invention, backwashing of the granular hardburned or lightburned magnesia is used to regenerate the filter media. The backwash is comprised of simply flushing the filter media with water or, preferably, a dilute acid solution, e.g., from about 1 to about 10 weight percent acid concentration, and most preferably from about 1 to about 5 weight percent acid concentration. The acidic backwashing strips the metal ions from the surface of the granules of magnesia, which stripped metal ions can be reclaimed or disposed of, as is appropriate. The stripping of the metal ions also results in a regeneration of the magnesia granules which can then be used for further metal ion absorption.

Of the types of acids which can be employed in the acid backwash, any conventional dilute acid, either organic or inorganic, can be employed. Among the preferred acids are sulfuric, nitric, acetic and hydrochloric acids.

While the process of the present invention can be employed most effectively with any aqueous feed, the invention is preferably designed as a "polishing filtration" system to remove potentially toxic metal ions from waste water streams. In most cases, the influent going to the magnesia containing filtration system would be pretreated plant effluent which has had the majority of toxic metal ions already removed, but which still contains metal ions of concentrations above permissible discharge limits. Accordingly, the influent is then passed through the magnesia filtration unit in order to "polish" the aqueous feed so that removal of the metal ions is completed.

The flow of aqueous feed through the filtration unit is generally on a continuous basis, with periodic interruptions occurring for an acidic backwash in order to regenerate the magnesia filter media. The backwash solution, which contains very concentrated amounts of metal ions, can be returned to the primary treatment facility for reprocessing, disposed of, or reclaimed as appropriate. The regenerated magnesia granules can continue to capture metal ions from the treatment plant effluent.

The following examples are provided in order to further illustrate the present invention and the advantages thereof. The examples are in no way meant to be limiting, but merely illustrative.

EXAMPLE 1

Several experimental runs were performed to compare the efficiency of different grades of granular MgO on the removal of metal cations from a synthetic waste water. For these runs, 50 grams each of a 20×30 mesh (minus 20 to plus 30 U.S. Standard mesh) material selected from 98 percent granular periclase MgO, granular hardburned MgO and granular lightburned MgO were used. Each grade was placed within a 0.75 inch inner diameter (ID) glass tube with synthetic water being supplied by a metering pump so as to maintain a positive head on the gravity flow system.

The synthetic water used (pH =7.57) was prepared from soluble salts of zinc, cadmium and copper to produce the following concentrations; 2.58 ppm Cu, 4.54 ppm Zn, and 1.24 ppm Cd.

The data recorded is reported in the following TABLE 1.

numbers gives 1130 BV for periclase and 836 BV for the hardburned magnesia.

From the data in the foregoing TABLE 1, it can be seen that as the pH of the effluent became more neutral, the efficiency of metal removal declined as reflected by the test employing the periclase. Compacted lightburned MgO was the most effective media with regard to removing metal cations from the water, although both the granular lightburned and granular hardburned were far superior to the periclase, particularly over time, with regard to the removal of metal ions from the aqueous feed. In particular, hardburned MgO was able to maintain a fairly constant through rate (10 liters in 8 hours) and effectively remove metal ions from the water over this time period.

Additional experimental runs were performed to compare the efficiency of deadburned, hardburned, and lightburned granular MgO on the removal of several types of metal cations from synthetic waste water at varying pH levels. These runs were conducted in a manner similar to those listed in TABLE 1, with the exception that the pH of the synthetic water used was set at varying levels of 3.5, 7.5, and 8.5. In one set of

TABLE 1

| | ml/min. | 20 × 30 Periclase | | | | | ml/min. | 20 × 30 Hardburned MgO | | | | | ml/min. | 20 × 30 Lightburned MgO | | | | |
|---|---|---|---|---|---|---|---|---|---|---|---|---|---|---|---|---|---|---|
| | | BV | pH | Cu | Zn | Cd | | BV | pH | Cu | Zn | Cd | | BV | pH | Cu | Zn | Cd |
| Synthetic Water (Conc) | | | 7.57 | 2.58 | 4.54 | 1.24 | | | 7.57 | 2.58 | 4.54 | 1.24 | | | 7.57 | 2.58 | 4.54 | 1.24 |
| 1 liter thru bed | 24 | 113 | 10.18 | 0.23 | 0.37 | 0.24 | 23.3 | 84 | 10.91 | 0.14 | 0.35 | 0.07 | 16.3 | 87 | 10.80 | 0 | 0.01 | 0.02 |
| 2 liters thru bed | 23.8 | 226 | 9.38 | 0.51 | 0.51 | 0.60 | 22.6 | | 10.87 | 0.07 | 0.17 | 0.13 | 10.7 | 174 | 10.74 | 0 | 0.01 | 0.02 |
| 3 liters thru bed | 23 | 339 | 7.98 | 0.87 | 1.47 | 0.80 | | 251 | | 0.03 | 0.09 | 0.02 | | | | | | |
| 4 liters thru bed | | | | | | | 22.3 | 335 | 10.26 | 0.12 | 0.22 | 0.07 | | | | | | |
| 5 liters thru bed | | 565 | 7.35 | 1.05 | 2.14 | 0.88 | | | | | | | 9.1 | 436 | 10.55 | 0 | 0.04 | 0.03 |
| 6 liters thru bed | | | | | | | | | | | | | | | | | | |
| 7 liters thru bed | 22 | 791 | | 1.21 | 2.56 | 0.93 | 21.9 | 585 | | 0.11 | 0.16 | 0.10 | | | | | | |
| 10 liters thru bed | | 1130 | 7.29 | 1.41 | 2.90 | 0.97 | | 836 | 9.97 | 0.22 | 0.15 | 0.18 | | | | | | |
| BV hr. (Average) | | 141.3 | | | | | | 104.5 | | | | | | 54.5 | | | | |
| % Metal Removal After | | | | | | | | | | | | | | | | | | |
| 1 liter | | | | 91.1 | 91.9 | 80.6 | | | | 94.6 | 92.3 | 94.4 | | | | 100 | 99.8 | 98.4 |
| 2 liters | | | | 80.2 | 88.8 | 51.6 | | | | 97.3 | 96.3 | 97.6 | | | | 100 | 99.8 | 98.4 |
| 5 liters | | | | 59.3 | 52.9 | 29.0 | | | | — | — | — | | | | 100 | 99.1 | 97.6 |
| 10 liters | | | | 45.3 | 36.1 | 21.8 | | | | 91.5 | 96.7 | 85.5 | | | | — | — | — |

Analyses are reported in parts per million (ppm)

In the foregoing TABLE 1, BV is a term employed in reference to ion exchange filters and it is defined as the "total volume (including voids) of the resin bed". Since 50 grams of MgO were used to prepare a filter bed, the density and particle shape of the various grades greatly influenced the BV number. For periclase, which has a high density and compact flat angular particle shape, the BV was 33.45 cm$^3$, while for hardburned, the BV was 45.20 cm$^3$ owing to its lower density and uniform, spherical shaped particles. Since both tests processed 37,800 ml, this volume divided by the respective BV runs, the synthetic water was prepared from soluble salts of lead, iron, chromium, nickel and zinc to produce the following concentrations: 5.4 ppm Pb, 4.0 ppm Fe, 2.0 ppm Cr, 4.0 ppm Ni, and 6.2 ppm Zn. In another set of runs, the synthetic water was prepared from soluble salts of silver, aluminum, copper and cobalt to produce the following concentrations: 4.0 ppm Ag, 4.3 ppm Al, 4.1 ppm Cu, and 3.9 ppm Co. The data recorded is reported in TABLES 1a-f. As can be seen from these tables, granular lightburned and granular hardburned MgO are far superior to periclase in the removal of a wide range of metal ions from water at varying pH levels.

TABLE 1a

| | ml/min. | 20 × 30 Periclase | | | | | | 20 × 30 Hardburned MgO | | | | | | 20 × 30 Lightburned MgO | | | | | |
|---|---|---|---|---|---|---|---|---|---|---|---|---|---|---|---|---|---|---|---|
| | | pH | Pb | Fe | Cr | Ni | Zn | pH | Pb | Fe | Cr | Ni | Zn | pH | Pb | Fe | Cr | Ni | Zn |
| Synthetic Water (Conc) | 22 | 3.5 | 5.4 | 4.0 | 2.0 | 4.0 | 6.2 | 3.5 | 5.4 | 4.0 | 2.0 | 4.0 | 6.2 | 3.5 | 5.4 | 4.0 | 2.0 | 4.0 | 6.2 |
| 1 liter thru bed | 22 | 10.0 | 0.4 | <.2 | <.2 | <.2 | 0.2 | 10.9 | 0.2 | <.2 | <.2 | <.2 | 0.03 | 10.5 | 0.02 | <.2 | <.2 | <.2 | 0.06 |
| 2 liters thru bed | 22 | 9.2 | 0.6 | <.2 | <.2 | <.2 | 0.4 | 10.8 | 0.08 | <.2 | <.2 | <.2 | 0.02 | 10.6 | 0.04 | <.2 | <.2 | <.2 | 0.03 |
| 5 liters thru bed | 22 | 8.0 | 0.3 | 0.6 | <.2 | 0.3 | 0.6 | 10.7 | 0.04 | <.2 | <.2 | <.2 | 0.01 | 10.6 | 0.02 | <.2 | <.2 | <.2 | 0.03 |
| 10 liters | 22 | 8.4 | 0.2 | 0.2 | 0.3 | 0.2 | 0.5 | 10.5 | 0.02 | <.2 | <.2 | <.2 | 0.02 | 10.3 | 0.06 | <.2 | <.2 | <.2 | 0.01 |

TABLE 1a-continued

| | ml/min. | 20 × 30 Periclase | | | | | 20 × 30 Hardburned MgO | | | | | 20 × 30 Lightburned MgO | | | | | |
|---|---|---|---|---|---|---|---|---|---|---|---|---|---|---|---|---|---|
| | | pH | Pb | Fe | Cr | Ni | Zn | pH | Pb | Fe | Cr | Ni | Zn | pH | Pb | Fe | Cr | Ni | Zn |
| thru bed % Metal Removal After | | | | | | | | | | | | | | | | | | | |
| 1 liter | | | 92.6 | >95 | >90 | >95 | 96.8 | | 96.3 | >95 | >90 | >95 | 99.5 | | 96.3 | >95 | >90 | >95 | 99.0 |
| 2 liters | | | 88.9 | >95 | >90 | >95 | 93.5 | | 98.5 | >95 | >90 | >95 | 99.7 | | 99.3 | >95 | >90 | >95 | 99.5 |
| 5 liters | | | 94.4 | 85.0 | >90 | 92.5 | 90.3 | | 99.3 | >95 | >90 | >95 | 99.8 | | 99.6 | >95 | >90 | >95 | 99.5 |
| 10 liters | | | 96.3 | 95.0 | 85.0 | 95.0 | 91.9 | | 99.6 | >95 | >90 | >95 | 99.7 | | 98.9 | >95 | >90 | >95 | 99.8 |

Analyses are reported in parts per million (ppm)

TABLE 1b

| | ml/min. | 20 × 30 Periclase | | | | | | 20 × 30 Hardburned MgO | | | | | | 20 × 30 Lightburned MgO | | | | | |
|---|---|---|---|---|---|---|---|---|---|---|---|---|---|---|---|---|---|---|---|
| | | pH | Pb | Fe | Cr | Ni | Zn | pH | Pb | Fe | Cr | Ni | Zn | pH | Pb | Fe | Cr | Ni | Zn |
| Synthetic Water (Conc) | 22 | 7.5 | 5.4 | 4.0 | 2.0 | 4.0 | 6.2 | 7.5 | 5.4 | 4.0 | 2.0 | 4.0 | 6.2 | 7.5 | 5.4 | 4.0 | 2.0 | 4.0 | 6.2 |
| 1 liter thru bed | 22 | 10.5 | 0.04 | <.2 | <.2 | <.2 | 0.01 | 10.7 | 0.01 | <.2 | <.2 | <.2 | 0.01 | 10.5 | 0.04 | <.2 | <.2 | <.2 | 0.05 |
| 2 liters thru bed | 22 | 10.4 | 0.05 | <.2 | <.2 | <.2 | 0.01 | 10.7 | 0.03 | <.2 | <.2 | <.2 | 0.03 | 10.5 | 0.04 | <.2 | <.2 | <.2 | 0.05 |
| 5 liters thru bed | 22 | 10.3 | 0.28 | <.2 | <.2 | <.2 | 0.03 | 10.6 | 0.02 | <.2 | <.2 | <.2 | 0.04 | 10.6 | 0.07 | <.2 | <.2 | <.2 | 0.04 |
| 10 liters thru bed | 22 | 9.9 | 0.30 | 0.9 | 0.3 | 0.7 | 0.17 | 10.3 | 0.02 | <.2 | <.2 | <.2 | 0.01 | 10.6 | 0.15 | <.2 | <.2 | <.2 | 0.06 |
| % Metal Removal After | | | | | | | | | | | | | | | | | | | |
| 1 liter | | | 99.3 | >95 | >90 | >95 | 99.8 | | 99.8 | >95 | >90 | >95 | 99.8 | | 99.3 | >95 | >90 | >95 | 99.2 |
| 2 liters | | | 99.1 | >95 | >90 | >95 | 99.8 | | 99.4 | >95 | >90 | >95 | 99.5 | | 99.3 | >95 | >90 | >95 | 99.2 |
| 5 liters | | | 94.8 | >95 | >90 | >95 | 99.5 | | 99.6 | >95 | >90 | >95 | 99.4 | | 98.7 | >95 | >90 | >95 | 99.4 |
| 10 liters | | | 94.4 | 77.5 | 85 | 82.5 | 97.3 | | 99.6 | >95 | >90 | >95 | 99.8 | | 97.2 | >95 | >90 | >95 | 99.0 |

Analyses are reported in parts per million (ppm)

TABLE 1c

| | ml/min. | 20 × 30 Periclase | | | | | | 20 × 30 Hardburned MgO | | | | | | 20 × 30 Lightburned MgO | | | | | |
|---|---|---|---|---|---|---|---|---|---|---|---|---|---|---|---|---|---|---|---|
| | | pH | Pb | Fe | Cr | Ni | Zn | pH | Pb | Fe | Cr | Ni | Zn | pH | Pb | Fe | Cr | Ni |
| Synthetic Water (Conc) | 22 | 8.5 | 5.4 | 4.0 | 2.0 | 4.0 | 6.2 | 8.5 | 5.4 | 4.0 | 2.0 | 4.0 | 6.2 | 8.5 | 5.4 | 4.0 | 2.0 | 4.0 |
| 1 liter thru bed | 22 | 10.4 | 0.02 | <.2 | <.2 | <.2 | 0.41 | 10.9 | <.01 | <.2 | <.2 | <.2 | <.01 | 10.3 | 0.17 | <.2 | <.2 | <.2 |
| 2 liters thru bed | 22 | 10.5 | 0.21 | <.2 | <.2 | <.2 | 0.25 | 10.8 | 0.01 | <.2 | <.2 | <.2 | <.01 | 10.8 | 0.27 | <.2 | <.2 | <.2 |
| 5 liters thru bed | 22 | 10.5 | 0.76 | 0.5 | <.2 | 0.4 | 0.02 | 10.2 | <.01 | <.2 | <.2 | <.2 | <.01 | 10.8 | 0.25 | <.2 | <.2 | <.2 |
| 10 liters thru bed | 22 | 10.2 | 0.40 | <.2 | <.2 | <.2 | 0.08 | 10.3 | 0.02 | <.2 | <.2 | <.2 | <.01 | 10.9 | 0.25 | <.2 | <.2 | <.2 |
| % Metal Removal After | | | | | | | | | | | | | | | | | | | |
| 1 liter | | | 99.6 | >95 | >90 | >95 | 93.4 | | >99.8 | >95 | >90 | >95 | >99.8 | | 96.9 | >95 | >90 | >95 |
| 2 liters | | | 96.1 | >95 | >90 | >95 | 96.0 | | 99.8 | >95 | >90 | >95 | >99.8 | | 95.0 | >95 | >90 | >95 |
| 5 liters | | | 85.9 | 87.5 | >90 | 90 | 99.7 | | >99.8 | >95 | >90 | >95 | >99.8 | | 95.4 | >95 | >90 | >95 |
| 10 liters | | | 92.6 | >95 | >90 | >95 | 98.7 | | 99.6 | >95 | >90 | >95 | >99.8 | | 95.4 | >95 | >90 | >95 |

Analyses are reported in parts per million (ppm)

TABLE 1d

| | ml/min. | 20 × 30 Periclase | | | | | 20 × Hardburned MgO | | | | | 20 × 30 Lightburned MgO | | | | |
|---|---|---|---|---|---|---|---|---|---|---|---|---|---|---|---|---|
| | | pH | Ag | Al | Cu | Co | pH | Ag | Al | Cu | Co | pH | Ag | Al | Cu | Co |
| Synthetic Water (Conc) | 22 | 3.5 | 4.0 | 4.3 | 4.1 | 3.9 | 3.5 | 4.0 | 4.3 | 4.1 | 3.9 | 3.5 | 4.0 | 4.3 | 4.1 | 3.9 |
| 1 liter thru bed | 22 | 10.3 | 0.7 | <.5 | 0.15 | <.2 | 10.3 | <.2 | <.5 | 0.1 | <.2 | 10.7 | <.2 | <.5 | 0.14 | <.2 |
| 2 liters thru bed | 22 | 10.2 | 1.0 | <.5 | 0.13 | <.2 | 10.1 | <.2 | <.5 | 0.07 | <.2 | 10.6 | <.2 | <.5 | 0.090 | <.2 |
| 5 liters thru bed | 22 | 9.8 | 2.0 | <.5 | 0.08 | 0.3 | 9.7 | <.2 | <.5 | 0.04 | <.2 | 10.5 | <.2 | <.5 | 0.060 | <.2 |
| 10 liters thru bed | 22 | 9.8 | 1.7 | <.5 | 0.61 | 0.4 | 9.9 | <.2 | <.5 | 0.03 | <.2 | 9.9 | <.2 | <.5 | 0.10 | <.2 |
| % Metal Removal After | | | | | | | | | | | | | | | | |
| 1 liter | | | 90 | >88 | 96.3 | >94.9 | | >95 | >88 | 97.6 | >94.9 | | >95 | >88 | 96.6 | >94.9 |
| 2 liters | | | 75 | >88 | 96.8 | >94.9 | | >95 | >88 | 98.3 | >94.9 | | >95 | >88 | 97.8 | >94.9 |
| 5 liters | | | 50 | >88 | 98.0 | 92.3 | | >95 | >88 | 99.0 | >94.9 | | >95 | >88 | 98.5 | >94.9 |

TABLE 1d-continued

|  | ml/min. | 20 × 30 Periclase | | | | | 20 × Hardburned MgO | | | | | 20 × 30 Lightburned MgO | | | |
|---|---|---|---|---|---|---|---|---|---|---|---|---|---|---|---|
|  |  | pH | Ag | Al | Cu | Co | pH | Ag | Al | Cu | Co | pH | Ag | Al | Cu | Co |
| 10 liters |  |  | 57.5 | >88 | 85.1 | 89.7 |  | >95 | >88 | 99.3 | >94.9 |  | >95 | >88 | 97.6 | >94.9 |

Analyses are reported in parts per million (ppm)

TABLE 1e

|  | ml/min. | 20 × 30 Periclase | | | | | 20 × 30 Hardburned MgO | | | | | 20 × 30 Lightburned MgO | | | | |
|---|---|---|---|---|---|---|---|---|---|---|---|---|---|---|---|---|
|  |  | pH | Ag | Al | Cu | Co | pH | Ag | Al | Cu | Co | pH | Ag | Al | Cu | Co |
| Synthetic Water (Conc) | 22 | 7.5 | 4.0 | 4.3 | 4.1 | 3.9 | 7.5 | 4.0 | 4.3 | 4.1 | 3.9 | 7.5 | 4.0 | 4.3 | 4.1 | 3.9 |
| 1 liter thru bed | 22 | 10.5 | <.2 | 0.6 | 1.2 | 0.8 | 10.3 | <.2 | <.5 | 0.1 | <.2 | 10.8 | <.2 | 1.7 | 0.2 | <.2 |
| 2 liters thru bed | 22 | 10.5 | <.2 | 0.9 | 0.9 | 0.6 | 10.5 | <.2 | <.5 | 0.15 | <.2 | 10.6 | <.2 | 0.8 | 0.8 | <.2 |
| 5 liters thru bed | 22 | 10.3 | <.2 | 1.7 | 1.5 | 1.0 | 10.4 | <.2 | 0.6 | 0.05 | <.2 | 10.6 | <.2 | 0.7 | 0.7 | <.2 |
| % Metal Removal After |  |  |  |  |  |  |  |  |  |  |  |  |  |  |  |  |
| 1 liter |  |  | >95 | 86 | 70.7 | 79.5 |  | >95 | >88 | 97.6 | >94.9 |  | >95 | 60.5 | 95.1 | >94.9 |
| 2 liters |  |  | >95 | 79 | 78 | 84.6 |  | >95 | >88 | 96.3 | >94.9 |  | >95 | 81.4 | 80.5 | >94.9 |
| 5 liters |  |  | >95 | 60.5 | 63.4 | 74.4 |  | >95 | 86 | 98.8 | >94.9 |  | >95 | 83.7 | 82.9 | >94.9 |

Analyses are reported in parts per million (ppm)

TABLE 1f

|  | ml/min. | 20 × 30 Periclase | | | | | 20 × 30 Hardburned MgO | | | | | 20 × 30 Lightburned MgO | | | | |
|---|---|---|---|---|---|---|---|---|---|---|---|---|---|---|---|---|
|  |  | pH | Ag | Al | Cu | Co | pH | Ag | Al | Cu | Co | pH | Ag | Al | Cu | Co |
| Synthetic Water (Conc) | 22 | 8.5 | 4.0 | 4.3 | 4.1 | 3.9 | 8.5 | 4.0 | 4.3 | 4.1 | 3.9 | 8.5 | 4.0 | 4.3 | 4.1 | 3.9 |
| 1 liter thru bed | 22 | 10.5 | <.2 | <.5 | .06 | <.2 | 10.7 | <.2 | <.5 | .07 | <.2 | 10.4 | <.2 | 0.6 | 1.4 | 1.4 |
| 2 liters thru bed | 22 | 20.4 | <.2 | 0.7 | 0.12 | <.2 | 10.6 | <.2 | <.5 | .03 | <.2 | 10.4 | <.2 | 0.9 | 1.8 | 1.7 |
| 5 liters thru bed | 22 | — | <.2 | 1.3 | 1.8 | 1.8 | 10.5 | <.2 | 0.6 | .04 | <.2 | 10.4 | <.2 | 2.0 | 2.5 | 2.4 |
| 10 liters thru bed | 22 | 10.3 | <.2 | 2.7 | 3.2 | 2.9 | 10.4 | <.2 | 0.9 | .70 | — | 10.4 | <.2 | 1.0 | 1.1 | 1.1 |
| % Metal Removal After |  |  |  |  |  |  |  |  |  |  |  |  |  |  |  |  |
| 1 liter |  |  | >95 | >88 | 98.5 | >94.8 |  | >95 | >88 | 98.3 | >94.8 |  | >95 | 86 | 65.9 | 64.1 |
| 2 liters |  |  | >95 | 83.7 | 97.0 | >94.8 |  | >95 | >88 | 99.3 | >94.8 |  | >95 | 79.1 | 56.1 | 56.4 |
| 5 liters |  |  | >95 | 69.8 | 56.0 | 51.3 |  | >95 | 86 | 99.0 | >94.8 |  | >95 | 53.5 | 39.0 | 38.5 |
| 10 liters |  |  | >95 | 37.2 | 22.0 | 25.6 |  | >95 | 79.1 | 82.9 | — |  | >95 | 76.7 | 73.2 | 71.8 |

Analyses are reported in parts per million (ppm)

EXAMPLE 2

Several tests were run to compare the effectiveness of metal removal of various size fractions of granular hard and lightburned magnesia. Periclase was not used in this test as a comparison due to the fact, as demonstrated in Example 1, it loses its ability to attach the metal ions rather quickly and would require more frequent backwashings, therefore resulting in more down time than the more active grades of MgO used in accordance with the present invention.

The test runs employed the following size fractions of magnesia:

| Test 1 - 12 × 20 Hardburned, | 1 ft. bed. |
|---|---|
| Test 2 - 12 × 16 Hardburned, | 1 ft. bed. |
| Test 3 - 8 × 12 Hardburned, | 1 ft. bed. |
| Test 4 - 8 × 12 Lightburned, | 1 ft. bed. |
| Test 5 - 8 × 12 Hardburned, | 3 ft. bed. |

The bed depths given are for a 0.75 inch ID glass tube. Each of these tests employed a synthetic waste water (pH 7.57), of the following chemical ion concentrations:

| Metal | ppm |
|---|---|
| Al | 0.7 |
| $Fe^{+3}$ | 0.8 |
| Co | 2.4 |
| Ni | 2.0 |
| Cu | 2.0 |
| Zn | 2.5 |
| Cd | 1.7 |
| Pb | 1.6 |

The synthetic waste water was allowed to gravity flow through the particular size fraction until (i) the pH of the effluent reached ≦9.0 or, (ii) the throughput rate was reduced by 60% from the initial rate. The cut-off pH of 9 was selected due to the narrow pH range (9–10) at which cadmium can be captured, as was shown in the experimental runs of Example 1. Other metals can still be captured at pH levels less than 9.

The results of the test runs are tabulated in Tables 2–6.

TABLE 2

Fraction 12 × 20 H.B. Depth 1 ft. Test 1

|  | ml/min. | Tot. Vol. | Metal ions in ppm | | | | | | | | |
|---|---|---|---|---|---|---|---|---|---|---|---|
|  |  |  | pH | Mg | Al | $Fe^{+3}$ | Co | Ni | Cu | Zn | Cd | Pb |
| Initial Water: |  |  | 7.57 | 5.4 | 0.7 | 0.8 | 2.4 | 2.0 | 2.0 | 2.5 | 1.7 | 1.6 |
| 8:05 Start | 75.8 |  |  |  |  |  |  |  |  |  |  |  |
| 8:30 |  | 2.0 |  |  |  |  |  |  |  |  |  |  |
| 8:35–8:45 | 51.5 | 3.0 | 9.58 | 7.5 | <0.1 | <0.1 | <0.1 | <0.1 | <0.1 | 1.7 | 0.3 | 0.5 |
| 9:05–9:25 | 27.6 |  | 10.02 | 8.2 | <0.1 | <0.1 | <0.1 | <0.1 | 0.7 | 0.7 | 0.2 | 0.3 |
| 9:54–10:10 | 12.4 | 4.8 | 10.30 | 8.5 | <0.1 | <0.1 | <0.1 | <0.1 | 5.6 | 0.1 | 0.6 |
| 10:15–10:25 |  |  |  |  |  |  |  |  |  |  |  |  |

TABLE 2-continued

| | | | Fraction 12 × 20 H.B. Depth 1 ft. Test 1 | | | | | | | | |
|---|---|---|---|---|---|---|---|---|---|---|---|
| | ml/ min. | Tot. Vol. | | | | | Metal ions in ppm | | | | |
| | | | pH | Mg | Al | $Fe^{+3}$ | Co | Ni | Cu | Zn | Cd | Pb |
| B.W. c 1 lt. D.I. $H_2O$ | | | 9.56 | 95 | 2.4 | 2.9 | 2.9 | 2.5 | 3.3 | 5.3 | 2.5 | 3.0 |
| 10:30–10:40 | 47.5 | 5.5 | 9.42 | 7.6 | <0.1 | <0.1 | 0.2 | 0.1 | <0.1 | 1.5 | 0.8 | 0.4 |
| 10:57 | | 6.0 | | | | | | | | | | |
| 11:20–11:50 | 21.0 | 7.4 | 9.39 | 8.0 | <0.1 | <0.1 | <0.1 | <0.1 | <0.1 | 5.4 | 0.6 | 0.5 |
| 11:50–12:00N | | | | | | | | | | | | |
| B.W. c 1 lt. D.I. $H_2O$ | | | 9.22 | 35 | 1.5 | 1.8 | 0.6 | 0.4 | 1.4 | 1.6 | 0.5 | 1.5 |
| 12:00N | 50.0 | | | | | | | | | | | |
| 12:30 | | 9 | | | | | | | | | | |
| 12:30–12:45 | 37.5 | | 8.03 | 7.0 | <0.1 | <0.1 | 1.4 | 1.1 | <0.1 | 6.8 | 1.5 | 0.6 |
| 1:01 | | 10 | | | | | | | | | | |
| 1:30–1:53 | 20.6 | | 8.52 | 7.7 | <0.1 | <0.1 | 1.0 | 0.8 | 1.3 | 8.1 | 2.4 | 2.2 |
| 2:00–2:15 | | | | | | | | | | | | |
| B.W. c 1 lt. D.I. $H_2O$ | | | 8.63 | 15 | 1.6 | 2.1 | 0.3 | 0.2 | 1.4 | 1.2 | 0.3 | 1.7 |
| 2:30 | | 12 | | | | | | | | | | |
| 2:30–2:45 | 38.7 | | 7.85 | 6.8 | <0.1 | <0.1 | 1.8 | 1.5 | <0.1 | 5.7 | 1.5 | 0.4 |
| 3:30–3:50 | 25.5 | 15 | 7.87 | 7.5 | <0.1 | <0.1 | 1.6 | 1.4 | 0.3 | 3.3 | 1.7 | 0.5 |
| 4:00 | | | | | | | | | | | | |
| B.W. c 1 lt. D.I. $H_2O$ | | | 7.57 | 15 | 1.1 | 1.5 | 0.2 | <0.1 | 1.0 | 0.5 | 0.1 | 1.2 |
| Granules re-B.W. c 25 ml, 5% HCl + 750 ml D.I. $H_2O$ | | | | 1310 | 4.4 | 3.2 | 16 | 14 | 6.2 | 17 | 9.9 | 4.6 |

B.W. - Back Wash

TABLE 3

| | | | Fraction 12 × 16 H.B. Depth 1 ft. Test 2 | | | | | | | | |
|---|---|---|---|---|---|---|---|---|---|---|---|
| | ml/ min. | Tot. Vol. | | | | | Metal ions in ppm | | | | |
| | | | pH | Mg | Al | $Fe^{+3}$ | Co | Ni | Cu | Zn | Cd | Pb |
| Initial Water: | | | 7.57 | 5.4 | 0.7 | 0.8 | 2.4 | 2.0 | 2.0 | 2.5 | 1.7 | 1.6 |
| 7:45 Start | 77.3 | | | | | | | | | | | |
| 7:50–7:57 | 62.9 | | 10.11 | 9.7 | <0.1 | <0.1 | <0.1 | 0.1 | 0.2 | 0.5 | 0.3 | 0.2 |
| 8:17–8:32 | 39.0 | 2.3 | 9.93 | 8.1 | <0.1 | <0.1 | <0.1 | <0.1 | <0.05 | 0.2 | 0.4 | <0.05 |
| 8:47–9:07 | 26.3 | | 10.04 | 8.1 | <0.1 | <0.1 | <0.1 | <0.1 | <0.05 | 0.09 | 0.2 | <0.05 |
| 9:15–9:20 | 22 | 3.5 | 10.11 | | | | | | | | | |
| 9:20–9:35 | | | | | | | | | | | | |
| B.W. c 1 lt. D.I. $H_2O$ | | | | 40 | 0.9 | 1.0 | 2.5 | 1.8 | 2.2 | 3.8 | 1.7 | 2.1 |
| 9:35 Restart | | | | | | | | | | | | |
| 9:45–9:55 | 60 | 4.0 | 8.81 | 7.1 | <0.1 | <0.1 | 1.3 | 0.9 | <0.05 | 0.2 | 1.2 | 0.08 |
| 10:00 | | 5.0 | | | | | | | | | | |
| 10:05–10:14 | 50.6 | | | | | | | | | | | |
| 11:05–11:15 | 35.5 | 8.2 | 8.44 | 7.6 | <0.1 | <0.1 | 1.4 | 1.0 | <0.05 | 0.3 | 1.1 | 0.05 |
| 11:15–11:25 | | | | | | | | | | | | |
| B.W. c 1 lt. D.I. $H_2O$ | | | 8.58 | 13 | 0.6 | 0.7 | 0.2 | 0.2 | 0.7 | 0.9 | 0.2 | 1.0 |
| 11:25 Restart | | | | | | | | | | | | |
| 11:35–11:40 | 71 | 9.0 | 7.82 | | | | | | | | | |
| 12:37 | | 11 | | | | | | | | | | |
| 12:50–12:58 | 52 | 13 | 7.39 | 7.3 | <0.1 | <0.1 | 2.3 | 1.9 | 0.1 | 1.2 | 1.8 | 0.4 |
| 1:21 | | 14 | | | | | | | | | | |
| 1:25–1:35 | | | | | | | | | | | | |
| B.W. c 1 lt. D.I. $H_2O$ | | | 7.78 | 75 | 0.8 | 0.9 | 0.5 | 0.4 | 1.4 | 0.9 | 0.3 | 1.0 |
| 1:40–1:50 | 61 | | 7.21 | 6.5 | <0.1 | <0.1 | 2.4 | 1.7 | 0.1 | 2.0 | 1.9 | 0.3 |
| 2:02–2:10 | | | | | | | | | | | | |
| B.W. c 100 ml. 5% Hcl 900 ml D.I. $H_2O$ | | | | 1160 | 6.1 | 3.1 | 10.1 | 10 | 11 | 16 | 7.7 | 7.9 |
| 2:10 Restart | | | | | | | | | | | | |
| 2:29 | | 17 | | | | | | | | | | |
| 2:40–2:50 | 70.8 | | 6.95 | | | | | | | | | |
| 3:16 | | 20 | | | | | | | | | | |
| 3:32 | | 21 | | | | | | | | | | |
| 3:42–3:52 | 55 | 22.2 | 6.87 | 7.4 | <0.1 | <0.1 | 2.4 | 1.7 | 0.2 | 1.6 | 1.7 | 0.5 |
| B.W. c 1 lt. D.I. $H_2O$ | | | | 120 | 0.9 | 1.3 | <0.1 | <0.1 | 0.6 | 0.2 | <0.1 | 0.7 |

B.W. - Back Wash

TABLE 4

| | | | Fraction 8 × 12 H.B. Depth 1 ft. Test 3 | | | | | | | | |
|---|---|---|---|---|---|---|---|---|---|---|---|
| | ml/ min. | Tot. Vol. | | | | | Metal ions in ppm | | | | |
| | | | pH | Mg | Al | $Fe^{+3}$ | Co | Ni | Cu | Zn | Cd | Pb |
| Initial Water: | | | 7.57 | 5.4 | 0.7 | 0.8 | 2.4 | 2.0 | 2.0 | 2.5 | 1.7 | 1.6 |
| 8:10 Start | 95 | | | | | | | | | | | |
| 8:15–8:19 | 87 | | 9.21 | 6.2 | <0.1 | <0.1 | 0.7 | 0.7 | 0.2 | 0.6 | 0.8 | 0.3 |
| 8:35 | | 2.0 | | | | | | | | | | |
| 8:40–8:45 | 62 | | 9.07 | | | | | | | | | |
| 9:10–9:17 | 51 | 4.0 | 9.01 | 6.1 | <0.1 | <0.1 | 0.9 | 0.8 | 0.06 | 0.5 | 1.0 | 0.2 |
| 9:30 | | 5.0 | | | | | | | | | | |
| 9:41–9:54 | 41.2 | | 8.92 | | | | | | | | | |

TABLE 4-continued

Fraction 8 × 12 H.B.   Depth 1 ft.   Test 3

| | ml/ min. | Tot. Vol. | pH | Mg | Al | Fe$^{+3}$ | Co | Ni | Cu | Zn | Cd | Pb |
|---|---|---|---|---|---|---|---|---|---|---|---|---|
| 10:18–10:43 | 30 | 7.0 | 8.98 | 6.7 | <0.1 | <0.1 | 0.9 | 0.8 | <0.05 | 0.3 | 0.9 | 0.1 |
| 11:22 | | 9.0 | | | | | | | | | | |
| 11:43–11:45 | 23.8 | | | | | | | | | | | |
| 11:45 | | | | | | | | | | | | |
| B.W. c 1 lt. D.W. H$_2$O | | | | 97 | 1.3 | 1.2 | 3.6 | 3.0 | 5.7 | 9.7 | 3.0 | 4.1 |
| 12:00N Restart | | | | | | | | | | | | |
| 12:10–12:14 | 92 | | 7.49 | 9.2 | <0.1 | <0.1 | 1.8 | 1.5 | 0.2 | 1.6 | 1.7 | 0.4 |
| 12:31 | | 12.5 | | | | | | | | | | |
| 12:59 | | 15.0 | | | | | | | | | | |
| 1:10–1:16 | 92.5 | 17.0 | 7.01 | | | | | | | | | |
| 1:22–1:32 | | | | | | | | | | | | |
| B.W. c 1 lt. D.W. H$_2$O | | | 7.80 | 33 | 0.3 | 0.5 | 0.2 | 0.2 | 0.8 | 0.6 | 0.2 | 0.5 |
| 2:10–2:16 | | | 6.95 | 6.0 | <0.1 | <0.1 | 2.0 | 1.7 | 0.3 | 1.8 | 1.6 | 0.6 |
| 2:24–2:43 B.W. c 100 ml 5% HCl + 900 ml D.I. H$_2$O | | | 1.15 | 1570 | 5.3 | 5.2 | 9.0 | 8.1 | 8.7 | 12 | 6.7 | 5.3 |
| 2.43 Restart | | | | | | | | | | | | |
| 2:54 | | 20.0 | | | | | | | | | | |
| 3:10–3:15 | 97.4 | 22.0 | 6.52 | 6.5 | <0.1 | <0.1 | 2.0 | 1.7 | 0.6 | 1.4 | 1.7 | 0.6 |
| 4:00 B.W. c 1 lt. D.I. H$_2$O | | 26.2 | | 113 | 0.3 | 0.6 | <0.1 | <0.1 | 0.3 | 0.1 | <0.1 | 0.3 |

B.W. - Back Wash

TABLE 5

Fraction 8 × 12 H.B.   Depth 1 ft.   Test 4

| | ml/ min. | Tot. Vol. | pH | Mg | Al | Fe$^{+3}$ | Co | Ni | Cu | Zn | Cd | Pb |
|---|---|---|---|---|---|---|---|---|---|---|---|---|
| Initial Water: | | | 7.57 | 5.4 | 0.7 | 0.8 | 2.4 | 2.0 | 2.0 | 2.5 | 1.7 | 1.6 |
| 8:05 Start | 43.3 | | | | | | | | | | | |
| 8:10–8:22 | 42.5 | | 10.61 | 16 | <0.1 | <0.1 | 0.3 | 0.2 | 0.3 | 0.7 | 0.4 | 0.4 |
| 8:30–8:50 | 27.1 | | 10.76 | | | | | | | | | |
| 8:53 | | 1.0 | | | | | | | | | | |
| 9:05–9:36 | 16.3 | | 10.70 | 14 | <0.1 | <0.1 | <0.1 | <0.1 | <0.05 | 0.1 | 0.09 | 0.1 |
| 9:54–10:13 B.W. c 1 lt. D.I. H$_2$O | | | 10.41 | 130 | 1.1 | 1.5 | 4.6 | 3.9 | 1.5 | 3.9 | 1.6 | 0.8 |
| 10:13 Restart | | | | | | | | | | | | |
| 10:20–10:30 | 42.3 | | 10.65 | 15 | <0.1 | <0.1 | 0.3 | 0.2 | 0.2 | 0.6 | 0.4 | 0.3 |
| 10:49 | | 4.0 | | | | | | | | | | |
| 11:20–11:48 | 17.0 | | 10.70 | | | | | | | | | |
| 12:30–1:11 | 11.0 | | 10.57 | | | | | | | | | |
| 1:11–1:30 B.W. c 1 lt. D.I. H$_2$O | | 6.2 | 10.62 | 92 | 1.0 | 1.2 | 6.4 | 5.3 | 2.6 | 5.6 | 3.7 | 1.7 |
| 1:30 Restart | | | 10.28 | | | | | | | | | |
| 1:47–1:59 | 43.3 | | 10.56 | | | | | | | | | |
| 2:42 | | 9.0 | | | | | | | | | | |
| 2:47–3:14 | 17.0 | | 10.56 | 16 | <0.1 | <0.1 | <0.1 | <0.1 | <0.05 | 0.2 | 0.1 | 0.1 |
| 4:00 b.w. c 1 lt. D.I. H$_2$O | | 10.2 | | 66 | 0.8 | 1.1 | 7.4 | 6.0 | 2.9 | 6.4 | 4.6 | 2.4 |

B.W. - Back Wash

TABLE 6

Fraction 8 × 12 H.B.   Depth 3 ft.   Test 5

| | ml/ min. | Tot. Vol. | pH | Mg | Al | Fe$^{+3}$ | Co | Ni | Cu | Zn | Cd | Pb |
|---|---|---|---|---|---|---|---|---|---|---|---|---|
| Initial Water: | | | 7.57 | 5.4 | 0.7 | 0.8 | 2.4 | 2.0 | 2.0 | 2.5 | 1.7 | 1.6 |
| 8:10 Start | 78 | | | | | | | | | | | |
| 8:32 | | 2.0 | | | | | | | | | | |
| 8:40–8:45 | 70 | | 10.43 | 6.1 | 0.2 | 0.3 | <0.1 | <0.1 | 0.1 | 0.2 | 0.1 | 0.2 |
| 9:10–9:15 | 61 | | 10.42 | | | | | | | | | |
| 9:23 | | 5.0 | | | | | | | | | | |
| 9:43 | | 6.0 | | | | | | | | | | |
| 10:03 | | 7.0 | | | | | | | | | | |
| 10:10–10:20 | 48.5 | | 10.37 | | | | | | | | | |
| 10:23 | | 8.0 | | | | | | | | | | |
| 10:50 | | 9.0 | | | | | | | | | | |
| 11:10–11:25 | 38.7 | | 10.43 | | | | | | | | | |
| 12:10 | 35.4 | 12.0 | | | | | | | | | | |
| 1:10–1:20 | 30.0 | 14.0 | 10.38 | 6.9 | <0.1 | <0.1 | <0.1 | <0.1 | <0.05 | <0.05 | 0.6 | <0.05 |
| 1:42 | | 15.0 | | | | | | | | | | |
| 2:14 | | 16.0 | | | | | | | | | | |
| 2:14–2:31 | 28.0 | | 10.34 | 6.0 | <0.1 | <0.1 | <0.1 | <0.1 | <0.05 | <0.05 | 0.6 | <0.05 |
| 2:39 B.W. c 1 lt. D.I. H$_2$O | | | 10.49 | 300 | 6.0 | 6.6 | 23 | 19 | 14 | 28 | 19 | 13 |
| 3:00 Restart | | | | | | | | | | | | |

TABLE 6-continued

| | ml/ min. | Tot. Vol. | Fraction 8 × 12 H.B. Depth 3 ft. Test 5 | | | | | | | | |
|---|---|---|---|---|---|---|---|---|---|---|---|
| | | | | Metal ions in ppm | | | | | | | |
| | | | pH | Mg | Al | $Fe^{+3}$ | Co | Ni | Cu | Zn | Cd | Pb |
| 3:10–3:16 | 81.7 | | 9.79 | 6.8 | <0.1 | <0.1 | 0.2 | 0.02 | <0.05 | 0.2 | 0.4 | 0.1 |
| 3:18 | | 18.0 | | | | | | | | | | |
| 4:00 B.W. c 1 lt. D.I. $H_2O$ | | 21.2 | 9.53 | 210 | 0.8 | 1.4 | 1.6 | 1.6 | 2.6 | 5.1 | 1.7 | 2.3 |

B.W. - Back Wash

As previously observed, the data in the foregoing Tables demonstrate that granular lightburned MgO (8×12) was extremely effective with regard to metal ion capture and the granules could be easily backwashed to remove the metal ions. Narrow ranged, large size fractions of hardburned MgO generally allowed greater throughput rates with longer run times until 50% flow loss occurred.

| | 12 × 20HB | 12 × 16HB | 8 × 12HB | 8 × 12LB |
|---|---|---|---|---|
| Daily thru-put, liters | 15 | 22.2 | 26.2 | 10.2 |
| Mins. to 50% flow loss | 55 | 47 | 70 | 45 |

The slower the throughput rate (in finer-sized fractions), the higher the initial pH value of the effluent, but the finer sized fractions also resulted in a quicker loss of throughput rate due to the occlusion of intergranular spaces. This rate loss is especially fast for the lightburned grade.

Backwashing with dilute HCl was found significantly more effective in removing metal ions from the granules than backwashing with de-ionized water, as seen by comparing the fifth backwash of test #1 (Table 2) and the fourth backwash of test #2 (Table 3) where HCl was used to backwash as opposed to water.

It is particularly to be noted that in test #4 (Table 5), the lightburned magnesia was able to maintain an effluent pH of 10.0 or greater throughout the day's run. Also, in test #5 (Table the 3 foot bed of 8×12 hardburned was able to maintain a pH of >10.0 level throughout the day.

The pH of the effluent can be used as an indicator to determine when the filter bed has lost its ability to capture metal ions from the influent. As previously mentioned, a pH of 9.0 is the point where "break-through" of cadmium occurs. For metals, like Al and $Fe^{+3}$, a pH level as low as 6.5 was still found effective for their removal from the influent.

EXAMPLE 3

A chrome solution representing the effluent that would need to be treated at a tannery for removal of chromium prior to effluent discharge was filtered through a magnesia filter medium of the present invention. A portion of the chrome liquor was diluted to make one liter of a 7 ppm chrome solution, which was passed through an 0.75 inch ID by 6 inch deep bed of 12×40 mesh granular hardburned magnesia. The chemical analysis of the effluent from the column showed that the effluent contained less than 1 ppm chromium. Upon backwashing the granules with 100 mls of 1% $H_2SO_4$, all of the chromium was removed from the granules.

Thus, the process of the present invention would find excellent application in a polishing filtration system for the leather tanning industry, as well as in other industries where the removal of metals from waste water is desired.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for the removal of metal ions from water, which process comprises filtering the water through a bed of granular hardburned or lightburned magnesium oxide.

2. The method of claim 1, wherein the bed of magnesium oxide is comprised of from about 80 to 9.5 weight percent of granular hardburned or lightburned magnesium oxide.

3. The method of claim 1, wherein the bed of magnesium oxide has a surface area in the range of from about 0.05 to about 200 $m^2/g$.

4. The method of claim 1, wherein the bed of magnesium oxide has a surface area in the range of from about 0.1 to about 60 $m^2/g$.

5. The method of claim 1, wherein the bed of magnesium oxide has a surface area in the range of from about 0.1 to about 10 $m^2/g$.

6. The method of claim 1, wherein the bed of magnesium oxide is comprised of granular magnesia having a mesh size in the range of from about ¾ inch to about 325 U.S. Standard mesh.

7. The method of claim 1, wherein the bed of magnesium oxide is comprised of granular magnesia having a mesh size in the range of from about 6 inch to about 100 U.S. Standard mesh.

8. The method of claim 1, wherein the bed of magnesium oxide is comprised of granular lightburned magnesium oxide.

9. The process of claim 1, wherein the bed of magnesium oxide is comprised of granular hardburned magnesium oxide.

10. The process of claim 1, wherein the magnesium oxide is contained in a pressurized filtration chamber.

11. The process of claim 1, wherein the magnesium oxide is contained in a gravity flow filtration chamber.

12. A process for the removal of metal ions from water, which comprises the steps of
   (i) filtering the water through a layer of granular hardburned or lightburned magnesium oxide to thereby remove the metal ions by capture onto the magnesium oxide, and
   (ii) backwashing the magnesium oxide in order to remove the captured metal ions to thereby regenerate the magnesium oxide.

13. The process of claim 12, wherein an acidic solution is used to backwash the magnesium oxide.

14. The process of claim 13, wherein the acidic backwash solution comprises a dilute acidic solution containing from about 1 to about 10 weight percent acid.

15. The process of claim 14, wherein the acid is comprised of sulfuric, nitric, acetic or hydrochloric acid.

16. The process of claim 15, wherein the concentration of the acid ranges from about 1 to about 5 weight percent.

17. The process of claim 12, wherein the filtering includes the use of a pressurized filtration chamber.

18. The process of claim 12, wherein the filtering includes the use of a gravity flow system.

19. A process for the removal of ions selected form the group consisting of heavy metal ions, antimony ions, selenium ions, beryllium ions, and aluminum ions from water, which comprises filtering the water through a bed of granular hardburned or lightburned magnesium oxide.

20. A method according to claim 19, wherein said ion is beryllium ion.

21. A method according to claim 19, wherein said ion is selenium ion.

22. A method according to claim 19, wherein said ion is antimony ion.

23. A process for the removal of metal ions selected from the group consisting of lead, iron, chromium, nickel, zinc, silver, copper, cobalt, and aluminum ions from water comprising filtering the water through a bed of granular hardburned or lightburned magnesium oxide.

24. A method according o claim 23, wherein said metal ion is lead ion.

25. A method according to claim 23, wherein said metal ion is iron ion.

26. A process according to claim 23, wherein said metal ion is chromium ion.

27. A method according to claim 23, wherein said metal ion is nickel ion.

28. A method according o claim 23, wherein said metal ion is zinc ion.

29. A method according to claim 23, wherein said metal ion is silver ion.

30. A method according to claim 23, wherein said metal ion is aluminum ion.

31. A method according to claim 23, wherein said metal ion is copper ion.

32. A method according to claim 23, wherein said metal ion is cobalt ion.

* * * * *

UNITED STATES PATENT AND TRADEMARK OFFICE
CERTIFICATE OF CORRECTION

PATENT NO. : 5,211,852
DATED : May 18, 1993
INVENTOR(S) : Richard H. Van de Walle et al.

It is certified that error appears in the above-identified patent and that said Letters Patent is hereby corrected as shown below:

Column 3, line 64, change "3%" to --33%--.

Columns 9 and 10, Table 1f, line 5, change "20.4" to --10.4--.

Column 10, line 50, change "$\leqq$" to --$\leq$--.

Column 15, lines 32 and 36, change "HCI" to --HCl--.

Column 15, line 41, after "Table" insert --6)--.

Column 16, claim 2, line 2, change "9.5" to --99.5--.

Column 17, claim 19, line 1, change "form" to --from--.

Column 18, claim 28, line 1, change "o" to --to--.

Signed and Sealed this

Nineteenth Day of July, 1994

Attest:

BRUCE LEHMAN

*Attesting Officer*  *Commissioner of Patents and Trademarks*